United States Patent
Mas et al.

(10) Patent No.: US 11,111,167 B2
(45) Date of Patent: Sep. 7, 2021

(54) CONTROL OF A CENTRALIZED AIR PRODUCTION SYSTEM FOR A WASTEWATER TREATMENT PLANT

(71) Applicant: SUEZ INTERNATIONAL, Paris la Défense (FR)

(72) Inventors: Thibaut Mas, Chatou (FR); Michel Fliess, Paris (FR)

(73) Assignee: SUEZ INTERNATIONAL, Paris la Défense (FR)

( * ) Notice: Subject to any disclaimer, the term of this patent is extended or adjusted under 35 U.S.C. 154(b) by 185 days.

(21) Appl. No.: 16/094,196

(22) PCT Filed: Apr. 14, 2017

(86) PCT No.: PCT/EP2017/059051
§ 371 (c)(1),
(2) Date: Oct. 16, 2018

(87) PCT Pub. No.: WO2017/182405
PCT Pub. Date: Oct. 26, 2017

(65) Prior Publication Data
US 2019/0127250 A1    May 2, 2019

(30) Foreign Application Priority Data
Apr. 18, 2016 (FR) ...................... 1600647

(51) Int. Cl.
  *C02F 3/20* (2006.01)
  *C02F 3/00* (2006.01)
(52) U.S. Cl.
  CPC ............. *C02F 3/20* (2013.01); *C02F 3/006* (2013.01); *C02F 2209/001* (2013.01);
  (Continued)

(58) Field of Classification Search
  CPC ...... C02F 3/20; C02F 3/006; C02F 2209/001; C02F 2209/006; C02F 2209/03; C02F 2209/22; C02F 2209/38; Y02W 10/10
  See application file for complete search history.

(56) References Cited

U.S. PATENT DOCUMENTS 8,916,047 B2 * 12/2014 Hruza ..................... C02F 1/687
 210/606
9,011,690 B2 *  4/2015 Leland .................. C02F 3/1284
 210/631

(Continued)

OTHER PUBLICATIONS

Fliess, et al., "Model-Free Control", International Journal of Control, vol. 86 (12), pp. 2228-2252, 2013.

(Continued)

*Primary Examiner* — Stephen Hobson
(74) *Attorney, Agent, or Firm* — BakerHostetler

(57) ABSTRACT

A system for supplying air to at least one biological water treatment basin, the system includes at least one air production machine; at least one air distribution system of the biological basin, the system comprising: an air distribution means connecting the air production machine to the biological basin; a first control means for controlling the pressure of the air distribution system, the first control means receiving a pressure value from the air distribution means and a time-variable setpoint determined on the basis of a prediction of the air demand of the biological basin and delivering, in response, a pressure value sent to the air distribution means.

13 Claims, 2 Drawing Sheets

(52) U.S. Cl.
CPC .... *C02F 2209/006* (2013.01); *C02F 2209/03* (2013.01); *C02F 2209/22* (2013.01); *C02F 2209/38* (2013.01); *Y02W 10/10* (2015.05)

(56) References Cited

U.S. PATENT DOCUMENTS

| | | | |
|---|---|---|---|
| 9,376,335 B2* | 6/2016 | Corben | C02F 3/286 |
| 2015/0053613 A1* | 2/2015 | Fujino | C02F 3/301 |
| | | | 210/614 |
| 2015/0266759 A1* | 9/2015 | Morgan | C02F 3/301 |
| | | | 210/614 |
| 2016/0264441 A1* | 9/2016 | Graveleau | C02F 3/085 |
| 2019/0092665 A1* | 3/2019 | Reid | C02F 3/006 |
| 2019/0382295 A1* | 12/2019 | Cannon | C02F 3/006 |
| 2020/0001240 A1* | 1/2020 | Hayashi | C02F 1/008 |

OTHER PUBLICATIONS

Piotrowski, et al., "Hierarchical Dissolved Oxygen Control for Activated Sludge Processes", Control Engineering Practice, vol. 16, Issue 1, pp. 114-131, Nov. 5, 2007.

Harja, et al., "Improvements in Dissolved Oxygen Control of an Activated Sludge Wastewater Treatment Process", Circuits, Systems, and Signal Processing, vol. 35, Issue 6, pp. 2259-2281, Mar. 9, 2016.

Kandare, et al., "Adaptive Control of the Oxidation Ditch Reactors in a Wastewater Treatment Plant", International Journal of Adaptive Control and Signalprocessing., vol. 26, No. 10, pp. 976-989, Oct. 2, 2012.

Ruano, et al., "A Systematic Approach for Fine-Tuning of Fuzzy Controllers Applied to WWTPs", Environmental Modelling and Software, vol. 25, No. 5, pp. 670-676, May 1, 2010.

* cited by examiner

CONTROL OF A CENTRALIZED AIR PRODUCTION SYSTEM FOR A WASTEWATER TREATMENT PLANT

CROSS-REFERENCE TO RELATED APPLICATIONS

This application is a National Stage of International patent application PCT/EP2017/059051, filed on Apr. 14, 2017, which claims priority to foreign French patent application No. FR 1600647, filed on Apr. 18, 2016, the disclosures of which are incorporated by reference in their entirety.

FIELD OF THE INVENTION

Technical Field of the Invention

The invention relates to the control of a centralized air production system supplying the biological treatment basins of a wastewater treatment plant (WWTP).

Background

Air production in wastewater treatment plants represents one of the most significant areas of energy expenditure for this type of plant. Large wastewater treatment plants generally comprise a plurality of biological treatment basins, with each of these basins having to be supplied with oxygen so that the bacteria present in the basins can degrade the incoming pollution.

FIG. 1 schematically shows the air supply of a known wastewater treatment plant of the prior art. In general, a wastewater treatment plant comprises one or more biological basins ($T_1$, $T_2$, ..., $T_n$), to which the water W to be treated is sent, with each of said basins comprising an air diffusion system, which can be of the membrane type, for example. Air production, which is intended for the biological basins, is provided by one or more air production machines ($M_1$, $M_2$, ..., $M_x$). The air exiting the machines is distributed, in this example, in a common supply pipe C, called "flue". The air supply of each of the basins of the plant, when the plant comprises a plurality of basins, is provided independently through an air bleed line ($S_1$, $S_2$, ..., $S_n$), specific to each basin, on the common flue. Each air bleed line is equipped with one or more air control valves (V1, V2, ..., $V_m$). In the example shown in FIG. 1, each air bleed line comprises a single supply valve (V1, V2, VN). The number of air bleed lines can differ from the number of air production machines.

The current control of valves that are used for centralized air production of a wastewater treatment plant is shown in FIG. 2. FIG. 2 shows air production machines ($M_1$, $M_2$, ..., $M_x$), for example, of the centrifugal air blower, screw or root compressor type, a plurality of air bleed lines ($S_1$, $S_2$, ..., $S_n$), a common flue C and the biological treatment basins ($T_1$, $T_2$, ..., Tn), all having the same configuration as the basin $T_1$ shown herein.

The air flow is controlled in order to keep the concentration of dissolved oxygen in each basin at a predetermined value. Dissolved oxygen is understood, within the scope of the present application, to be the oxygen that forms a homogeneous mixture with water. The opening of the air intake valve is controlled in order to provide the air flow setpoint. The production of the air unit is controlled to maintain a pressure in the common supply pipework.

The air supply in this system is controlled using two distinct control means.

The purpose of the first control means is to control the pressure in the flue at a constant pressure by means of a PID (Proportional Integral Derivative) controller, reference sign Reg. P in FIG. 2. The proportional controller receives as input a pressure measurement P in the flue and the pressure setpoint A in the flue and sends as output a command B to the air production machines M.

The second control means comprises two PID cascade controllers and controls the oxygen contribution in the biological basins T by controlling the opening/closing of each of the valves ($V_1$, $V_2$, ..., $V_m$) of the bleed lines ($S_1$, $S_2$, ..., $S_n$). The opening of the valve of a line is controlled by means of two PID cascade controllers (Reg. O2, Reg. Q). The control of the opening of the valve allows the air flow sent to the basin to be controlled.

The first PID controller, reference sign Reg. O2 in FIG. 2, receives as input the measurement of dissolved oxygen in the basin via a measurement sensor M, and receives a setpoint U, called oxygen setpoint. This setpoint can be fixed and can be modified by a monitoring operator as a function of the evolution of the operating parameters, that is, it is computed as a function of a measurement of the oxidation-reduction potential in the basin. The output v of the first controller Reg. O2 is sent as a setpoint to the second PID controller, reference sign Reg. Q in FIG. 2. This is an air flow setpoint. This setpoint value v is converted into $Nm^3/h$ between two minimum and maximum values that can be configured as a function of the stipulations of the manufacturer of the aeration means. This management between two values prevents the air production machines from entering their resonance zone.

The second controller Reg.Q therefore receives as a setpoint the output v of the first controller Reg. O2 and receives as input the air flow measurement of the basin that is obtained using a flowmeter N. At the output of the second controller Reg. Q, an open position setpoint x is sent to an air control valve V1.

Thus, this second control means requires the presence of sensors in the basins (oxidation-reduction potential, oxygen measurement, etc.) to determine the required oxygen flow.

PID (Proportional Integral Derivative) control has the disadvantage of experiencing a deterioration in its performance when the characteristics of the system evolve.

The existing control system thus proposes operation with a constant pressure in the flue, and an air flow variation sent to the basins that is only modulated by the partial, or non-partial, opening/closing of the valves. The value of the pressure in the flue is controlled for a maximum air demand instant in the basins in order to be able to respond to a high treatment demand. Thus, when the station has to treat a pollution peak over a period T, for example, over one day between 19:00 hours and 22:00 hours, typically after residents have taken their showers, the air flow in the basins must be able to respond to this high demand. The pressure in the flue is thus set to a high value in order to respond to the requirements of the station in this case of maximum operation, which generates high costs and only controlling the degree of opening of the valve allows the air flow to be modulated throughout the day. This control of the opening/closing of the valves leads to premature wear of said valves.

SUMMARY OF THE INVENTION

The aim of the invention is to propose means for reducing the energy consumption of the air production machines, whilst providing an optimal air flow for oxygenation of the biological basin as a function of the air requirements of said biological basin.

To this end, an aspect of the invention relates to a system for supplying air to at least one biological water treatment basin, said system comprising:
- at least one air production machine;
- at least one air distribution system of the biological basin, said system comprising:
  an air distribution means connecting the air production machine to the biological basin;
  a first control means for controlling the pressure of the air production machine, said control means receiving a pressure value from the air distribution means and a time-variable setpoint determined from a prediction of the air demand of the biological basin and delivering, in response, a pressure value sent as a pressure setpoint to the air production machine.

Air demand is understood to be the amount of air required to maintain an oxygen rate in the basin that is previously established as a function of the biological process implemented in the biological basin.

Thus, the pressure of the air production machine is variable and adjustable as a function of the seasonal oxygen demand of the basin. By continuously varying the air pressure in the air distribution means, this system allows the energy consumption of the air production machines to be optimized and thus limits the operating cost associated with supplying biological basins with air. Indeed, it is more energy efficient to keep the supply valves of the air distribution system open or practically open by varying the pressure of the air production machines, so as to adjust the incoming air flow of the biological basin, rather than keeping a high constant pressure in the air production machines while having to clamp the valves in order to adjust the incoming air flow of the biological basin.

Finally, for a fixed air flow, a pressure gain in the air distribution system is directly associated with a power gain on the air production machine.

In addition to the main features mentioned in the preceding paragraphs, the system according to the invention can have one or more additional features from among the following features, which are considered individually or according to the technically possible combinations:
- the air distribution system of the biological basin comprises an air diffusion means connecting the air distribution means to the biological basin, the prediction of the air demand of the biological basin being computed on the basis of the air flow in the air diffusion means over a predetermined time period. The system can also comprise a memory for storing the air flow in the air diffusion means over the predetermined time period. The air diffusion means is, for example, a diffuser of the membrane type or a set of diffusers of the membrane type;
- the air distribution system of the biological basin comprises a means for measuring the flow of the air diffusion means, said flow measuring means being connected to the first pressure control means of the air production machine;
- the first control means comprises a means for time series analysis of the air flow measured by the means for measuring the air flow over the predetermined time period. Said analysis means delivers, for a plurality of predetermined time intervals during the predetermined time period:
  the temporal occurrence of the maximum air demand of the biological basin;
  the rate of increment of the air demand of the biological basin.

The time series analysis means is also known as chronological series analysis means. A time series, or chronological series, is a series of digital values representing the evolution of a specific quantity over time.
- the system comprises a computation means, said computation means being adapted to deliver the pressure value for a time interval of the plurality of predetermined time intervals, said pressure value being computed on the basis of the temporal occurrence of the maximum air demand of the biological basin and of the rate of increment of the air demand of the biological basin;
- the air distribution means comprises a supply valve and the air distribution system of the biological basin comprises a second means for controlling the opening of said supply valve, said second control means receiving a measurement of a physico-chemical parameter of the biological basin and a predetermined setpoint of the opening of the supply valve and delivering, in response, a degree of opening of the supply valve. The measurement of a physico-chemical parameter is understood to be, for example, the measurement of the oxygen and nitrate concentration in the biological basin, or even a measurement of the turbidity of the biological basin;
- the second control means comprises a controller of the "proportional integral derivative" type;
- the second variable control means of the air supply valves comprises a controller of the "model-free control" type. This type of controller is particularly described in the document by "*Michel Fliess, Cedric Join., Model-free control, International Journal of Control* 86 (12), 2228-2252, 2013". It has the advantage of maintaining good performance levels over time (ageing phenomena, for example), contrary to conventional PID control, and of being more robust (rejection of unknown disruptions, for example). Model-free control is based on continuously updated local modeling solely based on knowledge of the input-output behavior of the system to be controlled. It allows adaptation to the variations of the air demand as a result of unique disruptions;
- the predetermined setpoint for the opening of the supply valve is between 50% and 90%, and preferably equal to 70%, of the opening of the supply valve. This value of the percentage of opening of the supply valves has the advantage of being able to preserve a safety margin for preventing unique air demand phenomena that are not taken into account by the seasonal model of the invention.

The invention also relates to a method for controlling the air supply of at least one biological water treatment basin, said at least one biological water treatment basin being supplied with air by an air supply system, said air supply system comprising at least one air production machine and at least one air distribution system of the biological basin comprising an air distribution means connecting the air production machine to the biological basin and a first control means (Reg. P) for controlling the pressure of the air distribution system, said method comprising:
- a step of determining the air demand of the biological basin over a predetermined time period;
- a step of computing a control pressure value to be sent to the air production machine as a function of the air demand of the biological basin.

This control method allows real-time control of the pressure to be applied at the input of the air production machine as a function of the air demand of the basin and so as to adjust the pressure of the air production machine to the minimum required value providing a sufficient oxygen flow for each of the basins. Preferably, the step of determining the air demand of the biological basin comprises, over the predetermined time period, determining:

the temporal occurrence of the maximum oxygen demand of the biological basin; and the rate of increment of the oxygen demand of the biological basin.

The determining step is a step of analyzing the oxygen demand of the supply basins over a reference duration, called predetermined time period. The reference duration can be several days, for example.

On the basis of the temporal occurrence of the maximum air demand and the maximum rate of increment of this demand, the determining step allows the next oxygen demand for the x next minutes (configurable time interval) and thus the pressure required in the air distribution means to be predicted.

The method can also comprise a preliminary step of characterizing a supply valve of the air distribution means. This preliminary step allows the control valve, as well as the load losses of the basin, to be characterized. This characterization allows, for an operating point of the valve (previously set opening percentage), an air flow to be associated with a given pressure. This preliminary step can be carried out in two different ways:

by an on-site test. Thus, in this embodiment, the pressure in the flue is varied, and the air flow delivered by the supply valves is measured for a fixed degree of opening of the valve. These measurements are carried out for a plurality of values of the degree of opening of the valve, then the suitable degree of opening of the valve is selected;

by the use of a valve characterization that is directly known by means of data from manufacturers.

This method is successively repeated, which results in real-time control of the pressure to be applied to the air production machine.

The invention also relates to a computer program product that can be directly loaded into the internal memory of a computer, comprising portions of software code for executing the steps of the method according to one of the aforementioned embodiments, when said program is executed on a computer.

BRIEF DESCRIPTION OF THE DRAWINGS

Further features and advantages of the invention will become apparent upon reading the following description, with reference to the accompanying drawings, in which.

For greater clarity, identical or similar elements are identified using identical reference signs throughout all the figures.

DETAILED DESCRIPTION

Figure 1:
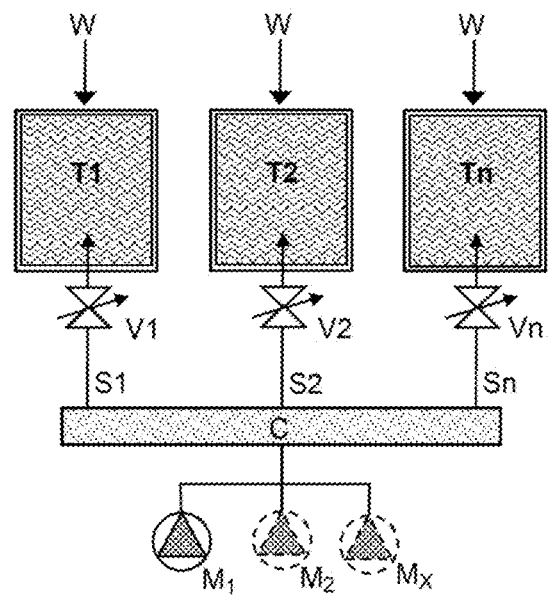
FIG. 1 is a schematic view of a system for supplying air to biological water treatment basins of the prior art.
Figure 2:
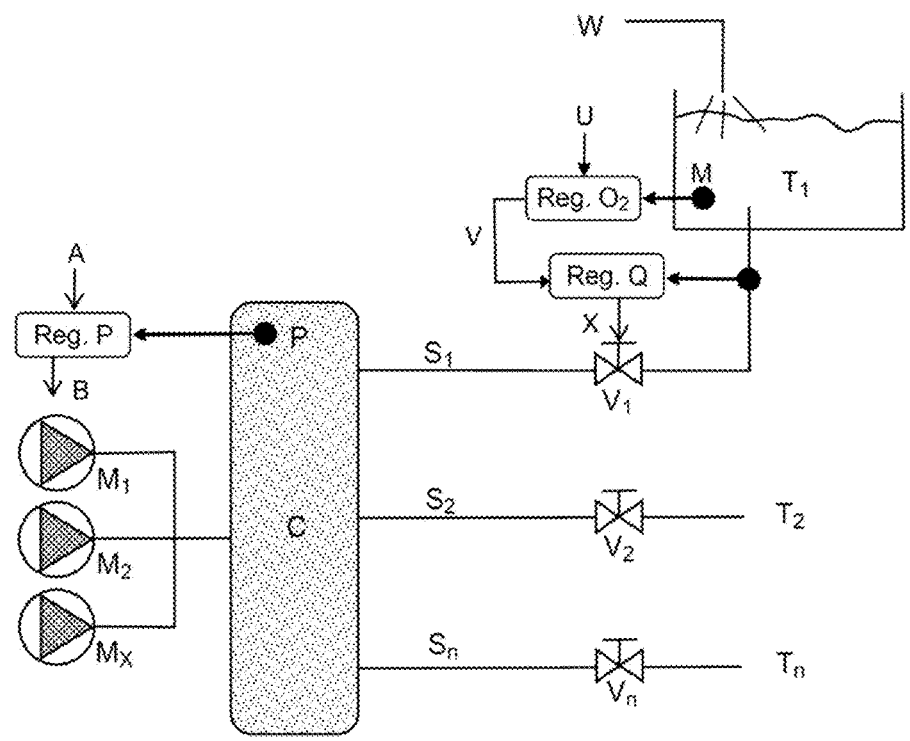
FIG. 2 is a schematic view of the centralized air control of biological water treatment basins of the prior art.
Figure 3:
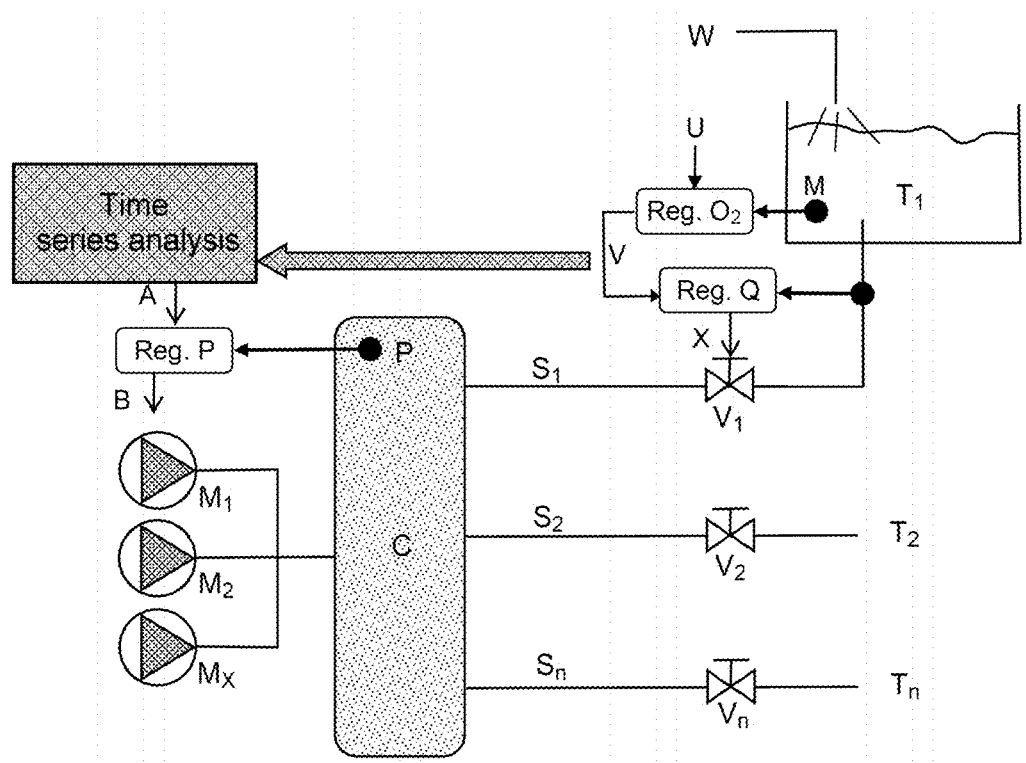
FIG. 3 is a schematic view of a system for supplying air to biological water treatment basins according to one embodiment of the invention.

FIG. 3 shows a system for supplying air to at least two biological water treatment basins (a single biological basin is shown, the basin T1 to which the water W to be treated is sent).

The system also comprises three air production machines ($M_1$, $M_2$, $M_x$). Each air production machine is connected to a common flue C of an air distribution means. The common flue is connected to at least two air bleed lines S1 and S2, with each of the air bleed lines being connected to a respective biological basin. The air bleed lines form part of the air distribution means. Between the flue and each biological basin, a supply valve $V_1$, $V_2$, $V_n$ is respectively disposed on the air bleed lines S1, S2, Sn.

FIG. 3 shows a first means Reg. P for controlling the pressure B of the air production machine. The first control means receives a pressure value P from the flue C and a time-variable setpoint A determined from a prediction of the air demand of the biological basin T1. To this end, the air distribution system of the biological system T1 comprises an air diffusion means connecting the air distribution means to the biological basin. A flow measurement means N is connected to a time series analysis means of the first control means. This time series analysis means records, for a predetermined time period, the air flow of the air diffuser at the inlet of the biological basin. A computation means distinct from the time series analysis means also can carry out this recording operation.

The air flow values for the predetermined time period are sent to the time series analysis means, which delivers, for a predetermined time interval, for example, 5 min, over the predetermined time period, for example, 3 days, the temporal occurrence of the maximum air demand of the biological basin and the rate of increment of the air demand of the biological basin. This time interval cannot be too short since it is connected to the dynamics of the air production machines, or too long since the advantage of a variable pressure setpoint of the air production machines would be lost. Therefore, a compromise is involved resulting from a discussion with the user. This time interval is fixed but can be variable.

In this embodiment, the time series analysis means identifies the temporal occurrence of the maximum air demand of the biological basin and the rate of increment of the air demand of the biological basin for 5 min time intervals for a measurement time period of three days. Based on these two values and on the actual air demand, the time series analysis means computes, for example, by polynomial expansion, for the next duration, corresponding to the predetermined time interval, the pressure setpoint value A to be sent to the first control means Reg P. The predetermined time interval is selected so as to allow the air distribution system to vary its pressure. Thus, the time series analysis means sends, at t0, the pressure setpoint value to be applied, at t0+time interval, to the air production machine.

FIG. 3 also shows the control of the first air production line comprising the air bleed line S1 and the supply valve V1. The opening of the supply valve V1 is controlled by a second control means of the proportional cascade control type, reference signs Reg. O2, Reg. Q in this embodiment. The second control means therefore comprises a first cascade controller Reg. O2 with a second controller Reg. Q. It can involve model-free control type controllers.

The first controller Reg. O2 receives as input a value of the oxygen or nitrate or turbidity M content of the basin and a setpoint U characterizing the opening of the supply valve. As output, it delivers a supply valve opening setpoint v sent to the second controller Reg. Q, which receives as input the air flow N at the inlet of the biological basin. The second controller delivers as output a supply valve opening percentage x.

The first controller Reg. O2 corresponds to the oxygen content of the basin and to a very high time constant. The second controller Reg. Q corresponds to the percentage of opening of the valve and to a very short time constant. Given that the opening of the valve needs to be controlled on the basis of the oxygen content of the basin, a cascade controller is used due to the differences in the dynamics of the two sub-systems.

The second controller Reg. Q of the cascade controller can be directly integrated in the supply valve. The second control means is not essential.

This proportional controller receives as input the data originating from a means, of the sensor type, for measuring the oxygen content of the biological basin supplied by the bleed line S1 and the valve V1. The setpoint sent to the controller is predetermined. The supply valve V1 therefore is always open in normal operating mode, i.e. without any disruption. There is no need to specify that this valve is useful for rejecting disruptions not considered when analyzing the histories of the demands of the preceding days. This also guides, on the one hand, the selection of the operating point (which must leave a certain margin for this disruption rejection action) and, on the other hand, the use of an effective control, the model-free control.

Figure 4:
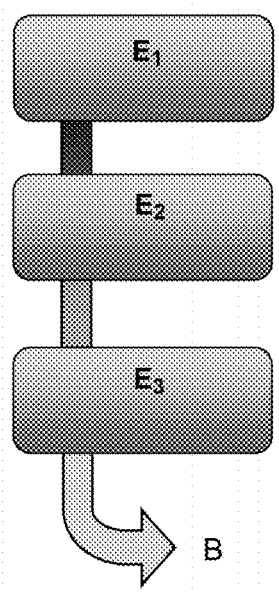
FIG. 4 is a schematic view of the steps carried out by the invention that allow the air pressure to be controlled in the supply flue of the biological basins in order to optimize the energy consumption of the air production machines.

FIG. 4 shows the steps of a method for controlling the supply of air to at least two biological water treatment basins by means of a system as shown in FIG. 3. In this particular example, the method comprises a preliminary step E1 of determining the valve opening setpoint to be applied to each of the valve supply controllers of the air bleed lines connecting the common flue to each biological basin. The method also comprises a step E2, called seasonal analysis step, of determining the air demand of the biological basin over a predetermined time period. This step E2 involves determining, over the predetermined time period, for example, several days, the temporal occurrence of the maximum oxygen demand of each biological basin, the time at which it occurred and the rate of increment of the oxygen demand of each biological basin. On the basis of the data determined during the seasonal analysis step, the method, during the step E3, computes the pressure P to be applied to the air production machine over a predetermined time interval of the predetermined period, which can be, for example, the next five minutes. This method is successively repeated, which results in real-time control of the pressure P to be applied to the air production machine.

The invention is not limited to the embodiments previously described with reference to the figures and variations can be contemplated without departing from the scope of the invention.

The invention claimed is:

1. A system for supplying air to at least one biological water treatment basin, said system comprising:
   at least one air production machine;
   at least one air distribution system of the at least one biological water treatment basin, said system comprising:
   an air distribution means connecting the at least one air production machine to the at least one biological water treatment basin;
   a first control means for controlling the pressure of the at least one air production machine, said first control means receiving a pressure value from the air distribution means and a time-variable setpoint determined from a prediction of an air demand of the at least one biological water treatment basin and delivering, in response, a pressure value sent as a pressure setpoint to the at least one air production machine.

2. The system as claimed in claim 1, wherein the air distribution system of the at least one biological water treatment basin comprises an air diffusion means connecting the air distribution means to the at least one biological water treatment basin, the prediction of the air demand of the at least one biological water treatment basin being computed based on an air flow in the air diffusion means over a predetermined time period.

3. The system as claimed in claim 2, wherein the air distribution system of the at least one biological water treatment basin comprises a means for measuring a flow of the air diffusion means, said flow measuring means being connected to the first control means of the at least one air production machine.

4. The system as claimed in claim 1, wherein the first control means comprises:
   a means for time series analysis of an air flow measured by an air flow measuring means over a predetermined time period, said means for time series analysis delivering, for a plurality of predetermined time intervals during the predetermined time period:
   a temporal occurrence of a maximum air demand of the at least one biological water treatment basin;
   a rate of increment of the air demand of the at least one biological water treatment basin.

5. The system as claimed in claim 1, comprising a computation means, said computation means being adapted to deliver the pressure value for at least one time interval of a plurality of predetermined time intervals, said pressure value being computed for the at least one time interval based on a temporal occurrence of a maximum air demand of the at least one biological water treatment basin and of a rate of increment of the air demand of the at least one biological water treatment basin delivered by a time series analysis means for a predetermined time interval.

6. The system as claimed in claim 1, wherein:
   the air distribution means comprises a supply valve;
   the air distribution system of the at least one biological water treatment basin comprises a second means for controlling the opening of said supply valve, said second control means receiving a measurement of a physico-chemical parameter of the at least one biological water treatment basin and a predetermined setpoint of the opening of the supply valve and delivering, in response, a degree of opening of the supply valve.

7. The system as claimed in claim 6, wherein the second means for controlling the opening of said supply valve comprises a controller of the "proportional integral derivative" type.

8. The system as claimed in claim 6 wherein the second means for controlling the opening of said supply valve comprises a controller of the "model-free control" type.

9. The system as claimed in claim 1, wherein a predetermined setpoint for the opening of the supply valve is between 50% and 90% of the opening of the supply valve.

10. A method for controlling an air supply with the system of claim 1, said method comprising:
- determining the air demand of the at least one biological basin over a predetermined time period;
- computing a control pressure value to be sent to the at least one air production machine as a function of the air demand of the at least one biological basin; and
- delivering, in response to the computing, a pressure value sent as a pressure setpoint to the at least one air production machine.

11. The method according to claim 10, wherein determining the air demand of the at least one biological basin comprises, over the predetermined time period, determining:
- a temporal occurrence of a maximum oxygen demand of the at least one biological basin; and
- a rate of increment of an oxygen demand of the at least one biological basin.

12. The method as claimed in claim 10, further comprising characterizing a supply valve of the air distribution means.

13. A non-transitory computer program product that can be directly loaded into the internal memory of a computer, comprising portions of software code for executing the method as claimed in claim 10, when said program is executed on a computer.

* * * * *